US012293704B2

(12) United States Patent
Zhang

(10) Patent No.: US 12,293,704 B2
(45) Date of Patent: May 6, 2025

(54) PIXEL COMPENSATION CIRCUIT, METHOD OF COMPENSATING PIXEL AND DISPLAY PANEL

(71) Applicant: Shenzhen China Star Optoelectronics Semiconductor Display Technology Co., Ltd., Guangdong (CN)

(72) Inventor: Lijun Zhang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/399,771

(22) Filed: Dec. 29, 2023

(65) Prior Publication Data

US 2024/0265848 A1 Aug. 8, 2024

(30) Foreign Application Priority Data

Feb. 6, 2023 (CN) ......................... 202310126170.3

(51) Int. Cl.
*G09G 3/32* (2016.01)

(52) U.S. Cl.
CPC ....... *G09G 3/32* (2013.01); *G09G 2310/0278* (2013.01); *G09G 2310/08* (2013.01); *G09G 2320/0233* (2013.01); *G09G 2330/021* (2013.01)

(58) Field of Classification Search
CPC ............. G09G 3/32; G09G 2310/0278; G09G 2310/08; G09G 2320/0233; G09G 2330/021; G09G 3/3233; G09G 2320/04
See application file for complete search history.

(56) References Cited

U.S. PATENT DOCUMENTS

| | | | | |
|---|---|---|---|---|
| 11,475,849 | B1 * | 10/2022 | Qiao | G09G 3/32 |
| 11,508,309 | B2 * | 11/2022 | Lin | G09G 3/3266 |
| 11,694,618 | B2 * | 7/2023 | Xue | G09G 3/3258 345/76 |
| 11,881,164 | B2 * | 1/2024 | Xu | G09G 3/2092 |
| 12,014,686 | B2 * | 6/2024 | Lin | G09G 3/3266 |
| 2014/0022150 | A1 * | 1/2014 | Guo | G09G 3/3233 345/76 |
| 2016/0171930 | A1 * | 6/2016 | Song | G09G 3/3225 345/77 |
| 2018/0047336 | A1 * | 2/2018 | Chen | G09G 3/3266 |
| 2019/0295463 | A1 * | 9/2019 | Ling | G09G 3/3225 |
| 2020/0058254 | A1 * | 2/2020 | Wang | G09G 3/3266 |
| 2021/0312864 | A1 * | 10/2021 | Zheng | G09G 3/3233 |
| 2021/0366383 | A1 * | 11/2021 | Ma | G09G 3/3233 |
| 2022/0189396 | A1 * | 6/2022 | Cai | G09G 3/035 |
| 2024/0038128 | A1 * | 2/2024 | Liu | G09G 3/2022 |

* cited by examiner

*Primary Examiner* — William Lu

(57) ABSTRACT

The present application provides a pixel compensation circuit, a method of compensating pixel, and a display panel. The pixel compensation circuit includes a compensation transistor, a driving transistor, a reset transistor, a first switching transistor, a second switching transistor, a first capacitor, a second capacitor, and a light-emitting device. Compared with the pixel compensation circuit in prior art, the present application does not need to adopt a plurality of array substrate gate driving circuit to achieve compensation function. That is, the scanning signal lines adopted by the present application are less, which is convenient to achieve narrow bezel of display products.

15 Claims, 5 Drawing Sheets

PIXEL COMPENSATION CIRCUIT, METHOD OF COMPENSATING PIXEL AND DISPLAY PANEL

RELATED APPLICATION

This application claims the benefit of priority of China Patent Application No. 202310126170.3 filed on Feb. 6, 2023. The contents of the above application are all incorporated by reference as if fully set forth herein in its entirety.

TECHNICAL FIELD

The present application relates to the field of display technology, and especially relates to a pixel compensation circuit, a method of compensating pixel, and a display panel.

BACKGROUND

Being different from a voltage driving mode of liquid crystal display panels, organic light-emitting diode (OLED), Micro light-emitting diodes (Micro LED) and Mini light-emitting diodes (Mini LED) are current-mode driving elements. A current during display period is determined by the driving transistor, the current Ipixel satisfies a formula Ipixel=K $(VGS-Vth)^2$. Coefficient K is related to mobility and size of a thin film transistor (TFT). VGS is a voltage difference between a gate and a source of a driving transistor. Vth is a threshold voltage of the driving transistor. It can be seen from the formula that if threshold voltages of driving transistors are different, especially in a range of low gray scale (in a case that VGS is less), the currents of pixels may be different, which eventually leads to brightness difference.

In order to compensate difference of threshold voltages of the driving transistors, various compensation methods have been provided. At present, there are two mainstream compensation methods including an external compensation and an internal compensation. The external compensation has a large compensation range of the threshold voltage for the driving transistor. However, a driving system of the external compensation is complex and has a high cost. A driving system of the internal compensation is relatively simple and has a low cost. However, the internal compensation has a low compensation range of threshold voltage of the drive transistor, so stability of the drive transistor is required to be high.

A pixel circuit of the internal compensation (nTnC) is generally more complex than a pixel circuit (3T1C) of the external compensation. Therefore, more gate scan stage transmission signals are needed, and a plurality of sets of array substrate gate driving circuits on array (GOA) are needed. Thus, a width of a bezel of the product is increased, which is unfavorable to appearance of the product.

SUMMARY

The present application provides a pixel compensation circuit, a method of compensating pixel and a display panel capable, which may compensate a driving transistor, adopt less scanning signal lines, and facilitate a narrow bezel of a display product compared with pixel compensation circuits in prior art.

In one aspect, the present application provides a pixel compensation circuit including a compensation transistor, a driving transistor, a reset transistor, a first switching transistor, a second switching transistor, a first capacitor, a second capacitor, and a light-emitting device.

A gate of the compensation transistor is electrically connected to a current stage scanning signal line, and a source of the compensation transistor is electrically connected to a first node, and a drain of the compensation transistor is electrically connected to a data line. The current stage scanning signal line is configured to provide a scanning signal, and the data line is configured to provide a data signal.

A gate of the driving transistor is electrically connected to the first node, a source of the driving transistor is electrically connected to a drain of the first switching transistor, and a drain of the driving transistor is electrically connected to a positive electrode of the light-emitting device. A negative electrode of the light-emitting device is electrically connected to a negative power supply.

A gate of the reset transistor is electrically connected to a compensation control line, a source of the reset transistor is electrically connected to the first node, and a drain of the reset transistor is electrically connected to a second voltage terminal.

A gate of the first switching transistor is electrically connected to a control signal line, a source of the first switching transistor is electrically connected to a positive power supply, and a drain of the first switching transistor is electrically connected to the source of the driving transistor.

A gate of the second switching transistor is electrically connected to a reset signal line, a source of the second switching transistor is electrically connected to a first voltage terminal, and a drain of the second switching transistor is electrically connected to a connection point between the drain of the driving transistor and the positive electrode of the light-emitting device; and a second node is formed at the connection point.

One terminal of the first capacitor is electrically connected to the positive power supply, and another terminal of the first capacitor is electrically connected to the second node.

One terminal of the second capacitor is electrically connected to the first node, and another terminal of the second capacitor is electrically connected to the second node.

In another aspect, the present application provides a method of compensating pixel, the method includes:

- providing the pixel compensation circuit mentioned above;
- providing the control signal line and the current stage scanning signal line with a low level, and providing the compensation control line and the reset signal line with a high level during a reset stage, so that an on state, and the compensation transistor and the first switching transistor are both in an off state; a the reset transistor and the second switching transistor are both in potential of the first node is reset to be a second voltage provided by the second voltage terminal, and a potential of the second node is reset to be a first voltage provided by the first voltage terminal;
- providing the control signal line and the compensation control line with a high level, and providing the reset signal line and the current stage scanning signal line with a low level during a detection stage, so that the first switching transistor and the reset transistor are both in an on state, and the second switching transistor and the compensation transistor are both in an off state; the voltage of the second node changes into a third voltage V3, the third voltage V3=V2−Vth, V2 is the second voltage V2, and Vth is a threshold voltage of the driving transistor;

providing the control signal line, the reset signal line, and the compensation control line with a low level, and providing current stage scanning signal lines with a high level row by row during a data writing stage, so that the compensation transistor is in an on state, and the reset transistor, the first switching transistor, and the second switching transistor are all in an off state; the first node is written into a data signal, a voltage of the second node changes into a fourth voltage V4, the fourth voltage V4=V3+(Data−V2)*[Cst/(Cst+C1)] =V2−Vth+(Data−V2)*[Cst/(Cst+C1)], Data is a data signal input from a data line Vdata; and providing the control signal line with a high level, and providing the compensation control line, the reset signal line, and the current stage scanning signal line with a low level during a light emitting stage, so that the first switching transistor and the driving transistor are in an on state, and the reset transistor, the second switching transistor, and the compensation transistor are in an off state; a source-drain voltage of the driving transistor T2_Vgs=(Data−V2)*[Cst/(Cst+C1)]+Vth, and the light-emitting device emits light.

In another aspect, the present application further provides a display panel including the pixel compensation circuit or employing the method for compensating pixel.

The pixel compensation circuit provided by the present application includes the compensation transistor, the driving transistor, the reset transistor, the first switching transistor, the second switching transistor, the first capacitor, the second capacitor, and the light-emitting device. A threshold voltage of the driving transistor can be compensated by combining the control signal line, the compensation control line, the reset signal line, the current stage scanning signal line, and a method for timing control that is set. Compared with the pixel compensation circuit in prior art, the present application does not need to adopt a plurality of array substrate gate driving circuit to achieve compensation function. That is, the scanning signal lines adopted by the present application are less, so that it is convenient to achieve narrow bezel of display products.

BRIEF DESCRIPTION OF THE DRAWINGS

In order to more clearly illustrate technical solutions in embodiments of the present application, the drawings needed to be used in the description of the embodiments are briefly introduced below. Obviously, the drawings in the following description are only some embodiments of the present application. For those skilled in the art, other drawings can also be obtained based on these drawings without exerting creative efforts.

DETAILED DESCRIPTION OF THE EMBODIMENT

Figure 1:
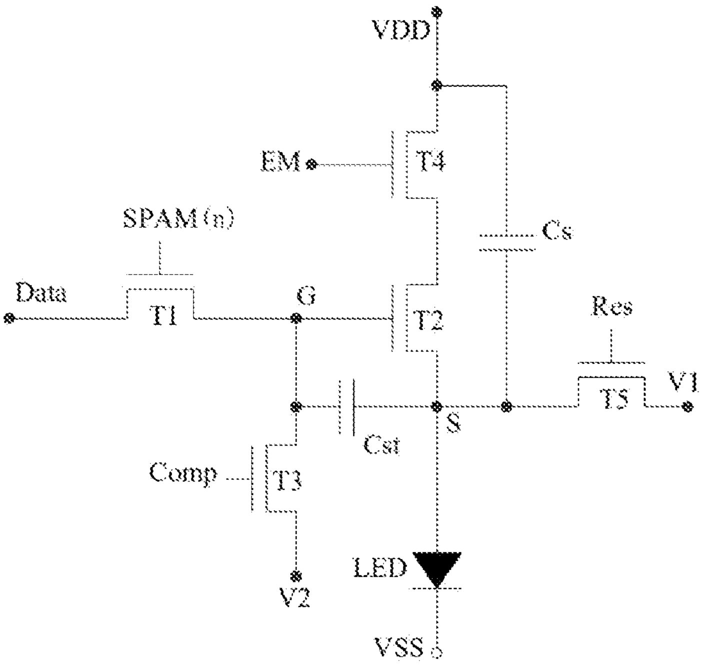
FIG. 1 is a circuit diagram of a pixel compensation circuit provided in an embodiment of the present application.

The technical solutions in the embodiments of the present application are clearly and completely described below in conjunction with the drawings in the embodiments of the present application. Obviously, the embodiments described are only a part of the embodiments of the present application, rather than all the embodiments. Based on the embodiments in the present application, all other embodiments obtained by those skilled in the art without creative works should be deemed as falling within the claims of the present application.

In the description of the present application, it should be understood that terms "first" and "second" are used for descriptive purposes only and cannot be understood to indicate or imply relative importance or to imply the number of technical features indicated. Thus, features defined as "first" and "second" may explicitly or implicitly include one or more of the features. In the description of the present application, "a plurality of" means two or more, unless expressly specified otherwise.

In the present application, the term "exemplary" is used to mean "serving as an example, illustration or illustration". Any embodiment described in the present application as "exemplary" is not necessarily construed as being more preferred or advantageous than other embodiments. The following description is given to enable any person skilled in the art to practice and use the present application. In following description, details are listed for purpose of explanation. It should be understood that one of ordinary skill in the art can recognize that the present application may be practiced without use of these specific details. In other examples, well-known structures and processes may not be elaborated in detail to avoid unnecessary details that obscure description of the present application. Therefore, the present application is not intended to be limited to embodiments shown, but is consistent with the widest scope consistent with principles and features disclosed herein.

Embodiments of the present application provides a pixel compensation circuit, a method of compensating pixel, and a display panel.

In one aspect, the present application provides a pixel compensation circuit including a compensation transistor, a driving transistor, a reset transistor, a first switching transistor, a second switching transistor, a first capacitor, a second capacitor, and a light-emitting device. A gate of the compensation transistor is electrically connected to a current stage scanning signal line, and a source of the compensation transistor is electrically connected to a first node, and a drain of the compensation transistor is electrically connected to a data line. The current stage scanning signal line is configured to provide a scanning signal, and the data line is configured to provide a data signal. A gate of the driving transistor is electrically connected to the first node, a source of the driving transistor is electrically connected to a drain of the first switching transistor, and a drain of the driving transistor is electrically connected to a positive electrode of the light-emitting device. A negative electrode of the light-emitting device is electrically connected to a negative power supply. A gate of the reset transistor is electrically connected to a compensation control line, a source of the reset transistor is electrically connected to the first node, and a drain of the reset transistor is electrically connected to a second voltage terminal. A gate of the first switching transistor is electrically connected to a control signal line, a source of the first switching transistor is electrically connected to a positive power supply, and a drain of the first switching transistor is electrically connected to the source of the driving transistor. A gate of the second switching transistor is electrically connected to a reset signal line, a source of the second switching transistor is electrically connected to a first voltage terminal, and a drain of the second switching transistor is electrically connected to a connection point between the drain of the driving transistor and the positive electrode of the light-emitting device; and a second node is formed at the connection point. One terminal of the first capacitor is electrically connected to the positive power supply, and another terminal of the first capacitor is electrically connected to the second node. One terminal of the second capacitor is electrically connected to the first node, and another terminal of the second capacitor is electrically connected to the second node.

In some embodiments, the current stage scanning signal line, the compensation control line, the reset signal line, and the control signal line are combined to successively provide a reset stage, a detection stage, a data writing stage, and a light emitting stage, respectively.

In some embodiments, during the reset stage, both the control signal line and the current stage scanning signal line are provided with a low level, and both the compensation control line and the reset signal line are provided with a high level.

In some embodiments, during the reset stage, both the reset transistor and the second switching transistor are in an on state, and both the compensation transistor and the first switching transistor are in an off state.

In some embodiments, during the detection stage, both the control signal line and the compensation control line are provided with a high level, and both the reset signal line and the current stage scanning signal line are provided with a low level.

In some embodiments, during the detection stage, the first switching transistor and the reset transistor are both in on state, and the second switching transistor and the compensation transistor are both in an off state.

In some embodiments, during the data writing stage, the control signal line, the reset signal line, and the compensation control line are provided with a low level, and current stage scanning signal lines are provided with a high level row by row.

In some embodiments, during the data writing stage, the compensation transistor is in an on state, and the reset transistor, the first switching transistor, and the second switching transistor are in an off state.

In some embodiments, during the light emitting stage, the control signal line is provided with a high level, and the compensation control line, the reset signal line, and the current stage scanning signal line are provided with a low level.

In some embodiments, during the light emitting stage, the first switching transistor is in an on state, and the reset transistor, the second switching transistor, and the compensation transistor are all in an off state.

In another aspect, the present application provides a method of compensating pixel, the method includes:

- providing the pixel compensation circuit mentioned above;
- providing the control signal line and the current stage scanning signal line with a low level, and providing the compensation control line and the reset signal line with a high level during a reset stage, so that the reset transistor and the second switching transistor are both in an on state, and the compensation transistor and the first switching transistor are both in an off state; a potential of the first node is reset to be a second voltage provided by the second voltage terminal, and a potential of the second node is reset to be a first voltage provided by the first voltage terminal;
- providing the control signal line and the compensation control line with a high level, and providing the reset signal line and the current stage scanning signal line with a low level during a detection stage, so that the first switching transistor and the reset transistor are both in an on state, and the second switching transistor and the compensation transistor are both in an off state; the voltage of the second node changes into a third voltage V3, the third voltage $V3=V2-Vth$, V2 is the second voltage V2, and Vth is a threshold voltage of the driving transistor;
- providing the control signal line, the reset signal line, and the compensation control line with a low level, and providing current stage scanning signal lines with a high level row by row during a data writing stage, so that the compensation transistor is in an on state, and the reset transistor, the first switching transistor, and the second switching transistor are all in an off state; the first node is written into a data signal, a voltage of the second node changes into a fourth voltage V4, the fourth voltage $V4=V3+(Data-V2)*[Cst/(Cst+C1)]=V2-Vth+(Data-V2)*[Cst/(Cst+C1)]$, Data is a data signal input from a data line Vdata; and
- providing the control signal line with a high level, and providing the compensation control line, the reset signal line, and the current stage scanning signal line with a low level during a light emitting stage, so that the first switching transistor and the driving transistor are in an on state, and the reset transistor, the second switching transistor, and the compensation transistor are in an off state; a source-drain voltage of the driving transistor $T2\_Vgs=(Data-V2)*[Cst/(Cst+C1)]+Vth$, and the light-emitting device emits light.

In another aspect, the present application further provides a display panel including the pixel compensation circuit or employing the method for compensating pixel.

The pixel compensation circuit, the method of compensating pixel, and the display panel are described in detail below.

As shown in FIG. 1, FIG. 1 is a circuit diagram of a pixel compensation circuit provided in an embodiment of the present application. The pixel compensation circuit includes a compensation transistor T1, a driving transistor T2, a reset transistor T3, a first switching transistor T4, and a second switching transistor T5, a first capacitor Cs, a second capacitor Cst, and a light-emitting device LED. The compensation transistor T1 is a compensation transistor for compensating a threshold voltage of the driving transistor T2. The driving transistor T2 is a driving transistor for driving the light-emitting device LED to emit light. The reset transistor T3 is a reset transistor for controlling a reset of the pixel compensation circuit. The first switching transistor T4 is a control switch transistor for controlling the light-emitting device LED to emit light. The second switching transistor T5 is a control switch transistor for controlling a data signal to be written into the pixel compensation circuit.

A gate of the compensation transistor T1 is electrically connected to a current stage scanning signal line SPAM (n). A source of the compensation transistor T1 is electrically connected to a first node G. A drain of the compensation transistor T1 is electrically connected to a data line Vdata. The current stage scanning signal line SPAM is configured to provide a scanning signal. The data line Vdata is configured to provide the data signal.

The current stage scanning signal line SPAM(n) represents a gate scan signal for a $n^{th}$ row pixel unit outputted by a gate side driving circuit. A previous stage scan signal SPAM(n−1) represents a gate scan signal for a $(n-1)^{th}$ row pixel unit outputted by the gate side driving circuit.

A gate of the driving transistor T2 is electrically connected to the first node G. A source of the driving transistor T2 is electrically connected to a drain of the first switching transistor T4. A drain of the driving transistor T2 is electrically connected to a positive electrode of the light-emitting device LED. A negative electrode of the light-emitting device LED is electrically connected to a negative power supply VSS.

A gate of the reset transistor T3 is electrically connected to a compensation control line Comp(n). A source of the reset transistor T3 is electrically connected to the first node G. A drain of the reset transistor T3 is electrically connected to a second voltage terminal V2.

A gate of the first switching transistor T4 is electrically connected to a control signal line EM. A source of the first switching transistor T4 is electrically connected to a positive power supply VDD. A drain of the first switching transistor T4 is electrically connected to the source of the driving transistor T2.

A gate of the second switching transistor T5 is electrically connected to a reset signal line Res. A source of the second switching transistor T5 is electrically connected to a first voltage terminal V1. A drain of the second switching transistor T5 is electrically connected to a connection point between the drain of the driving transistor T2 and the positive electrode of the light-emitting device LED. A second node S is formed at the connection point.

One terminal of the first capacitor Cs is electrically connected to the power source positive electrode VDD, and the other end of the first capacitor Cs is electrically connected to the second node S.

One terminal of the second capacitor Cst is electrically connected to the first node G, and another terminal of the second capacitor Cst is electrically connected to the second node S.

In this embodiment, the compensation transistor T1, the driving transistor T2, the reset transistor T3, the first switching transistor T4, and the second switching transistor T5 may all adopt an N-channel thin film transistor (TFT), such as an N-channel amorphous silicon transistor (a-Si), an N-channel low temperature poly-silicon transistor (N-LTPS), or an N-channel metal oxide semiconductor field-effect Transistor (MOSFET). The compensation transistor T1, the driving transistor T2, the reset transistor T3, the first switching transistor T4, and the second switching transistor T5 may also be a P-channel thin film transistor, such as a P-channel low temperature poly-silicon (P-LTPS), a P-channel metal oxide semiconductor field effect transistor, and the like, which is not specifically limited in this embodiment.

The driving transistor T2 serves as a driving transistor for driving the light-emitting device LED to emit light in the pixel compensation circuit. The pixel compensation circuit proposed in the present application can compensate the threshold voltage of the driving transistor (i.e., the driving transistor T2). In this embodiment, the current stage scanning signal line SPAM (n), the compensation control line Comp (n), the reset signal line Res, and the control signal line EM are all controlled by an external timing controller.

Figure 2:
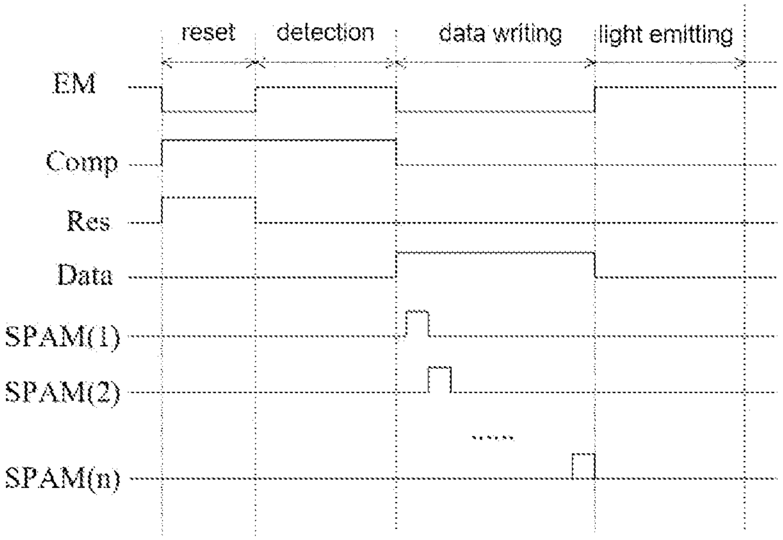
FIG. 2 is a timing diagram of a pixel compensation circuit provided in an embodiment of the present application.

In the pixel compensation circuit of the present application, as shown in FIG. 2, the current stage scanning signal line SPAM(n), the compensation control line Comp(n), the reset signal line Res, and the control signal line EM are combined to successively provide a reset stage, a detection stage, a data writing stage, and a light emitting stage.

Potential changes during the reset stage, the detection stage, the data writing stage, and the light emitting stage and how to compensate the threshold voltage of the driving transistor are analyzed in detail.

During the reset stage, the control signal line EM and the current stage scanning signal line SPAM(n) are provided with a low level, and the compensation control line Comp(n) and the reset signal line Res are provided with a high level.

Figure 3:
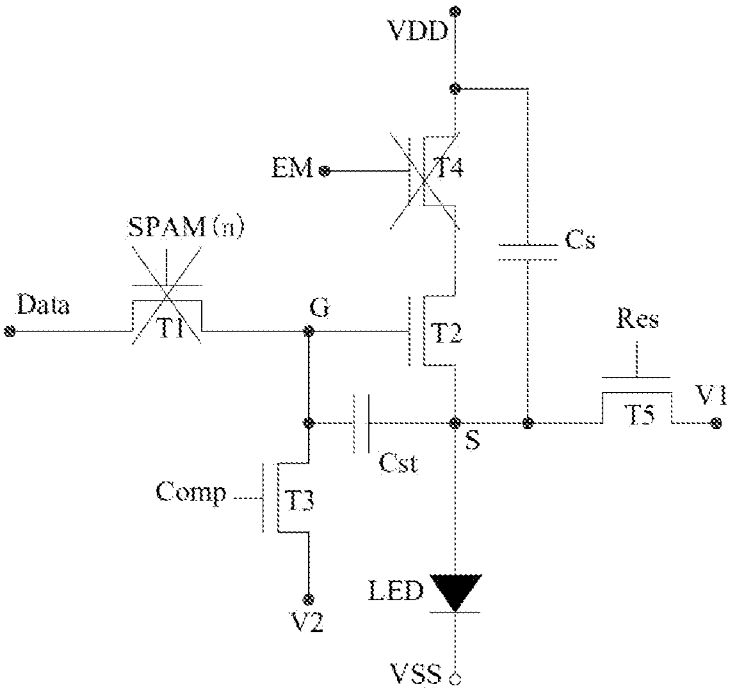
FIG. 3 is a circuit diagram of a pixel compensation circuit provided in an embodiment of the present application during a reset stage.

During this stage, as shown in FIG. 3, the reset transistor T3 and the second switching transistor T5 are both in an on state, and the compensation transistor T1 and the first switching transistor T4 are both in an off state.

During this stage, a potential of the first node G is reset to a second voltage V2 provided by the second voltage terminal V2, and a potential of the second node S is reset to a first voltage V1 provided by the first voltage terminal V1. Since both the first switching transistor T4 and the driving transistor T2 are in an off state, the light-emitting device LED does not emit light at this stage.

During the detection stage, the control signal line EM and the compensation control line Comp(n) are both provided with a high level, and the reset signal line Res and the current stage scanning signal line SPAM(n) are both provided with a low level.

Figure 4:
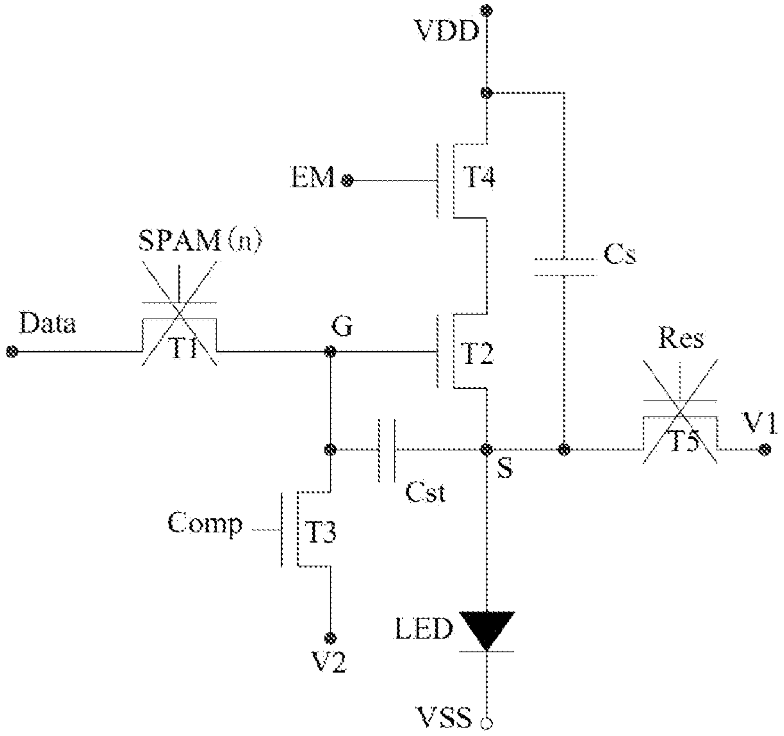
FIG. 4 is a circuit diagram of a pixel compensation circuit provided in an embodiment of the present application during a detection stage.

During this stage, as shown in FIG. 4, the first switching transistor T4 and the reset transistor T3 are both in an on state, and the second switching transistor T5 and the compensation transistor T1 are both in an off state.

During this stage, a power supply positive voltage VDD starts to discharge until a voltage between gate and source of the driving transistor T2 changes into the threshold voltage Vth of the driving transistor T2, and the driving transistor T2 is turned off. At this stage, the voltage of the second node S changes into a third voltage V3, and the third voltage V3=V2−Vth. That is, the third voltage of the second node S includes the threshold voltage Vth of the driving transistor T2. Since the driving transistor T2 is in an off state, the light-emitting device LED does not emit light.

During the data writing stage, the control signal line EM, the reset signal line Res, and the compensation control line Comp(n) are all provided with a low level, and the current stage scanning signal lines SPAM (n) are successively provided with a high level row by row.

Figure 5:
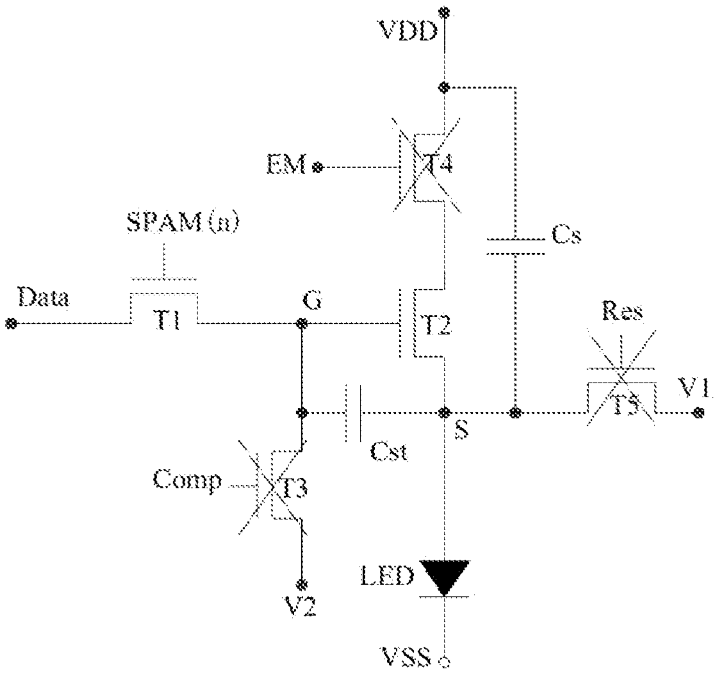
FIG. 5 is a circuit diagram of a pixel compensation circuit provided in an embodiment of the present application during a data writing stage.

At this stage, as shown in FIG. 5, the compensation transistor T1 controlled by the current stage scanning signal line SPAM (n) is in an on state, and the reset transistor T3, the first switching transistor T4, and the second switching transistor T5 are all in an off state.

At this stage, the first node G is written into a data signal Vdata. Since the voltage of the second node S changes into V3 during the detection stage, the data signal Vdata is coupled to the second node S through the first capacitor Cs.

A voltage of the second node S changes into a fourth voltage V4. The fourth voltage V4=V3+(Data−V2)*[Cst/(Cst+C1)]=V2−Vth+(Data−V2)*[Cst/(Cst+C1)]. Therefore, a source-drain voltage of the driving transistor T2 T2_Vgs=(Data−V2)*[Cst/(Cst+C1)]+Vth. That is, at this stage, the voltage of the second node S includes the threshold voltage Vth of the driving transistor T2. Since the driving transistor T2 and the first switching transistor T4 are still in an off state, the light-emitting device LED does not emit light.

During the light emitting stage, the control signal line EM is provided with a high level, and the compensation control line Comp(n), the reset signal line Res, and the current stage scanning signal line SPAM (n) are provided with a low level.

Figure 6:
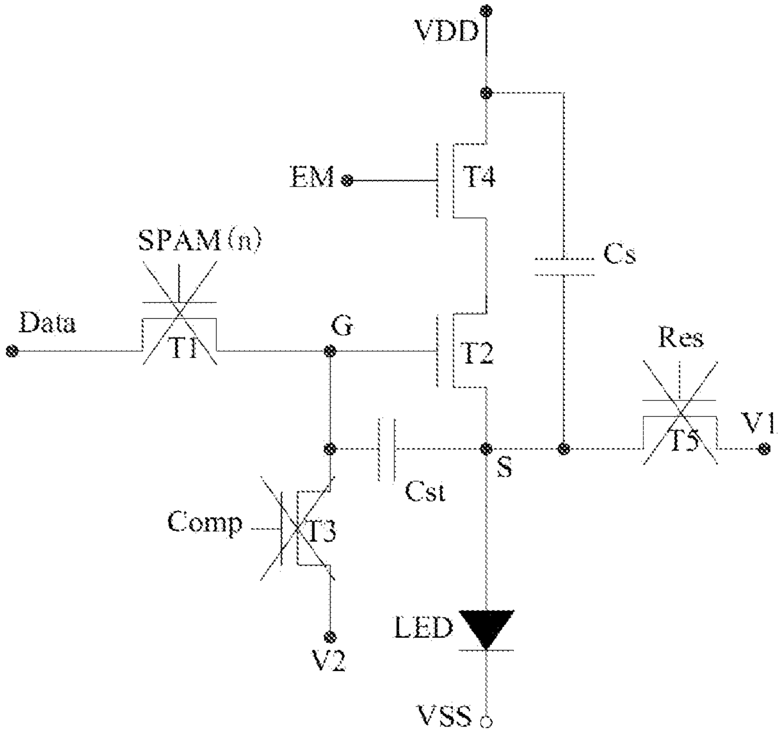
FIG. 6 is a circuit diagram of a pixel compensation circuit provided in an embodiment of the present application during a light emitting stage.

At this stage, as shown in FIG. 6, the first switching transistor T4 is in an on state, and the reset transistor T3, the second switching transistor T5, and the compensation transistor T1 are all in an off state.

At this stage, both the first switching transistor T4 and the driving transistor T2 are turned on. Since the source-drain voltage of the driving transistor T2 T2_Vgs=(Data−V2)*[Cst/(Cst+C1)]+Vth during the data writing stage. That is, the source-drain voltage of the driving transistor T2 includes the threshold voltage Vth of the driving transistor T2. A current flowing through the light-emitting device LED is independent of the threshold voltage Vth according to a current formula of the TFT saturation region. Compensation for the threshold voltage of the driving transistor is realized, and the light-emitting device LED emits light.

By the pixel compensation circuit, an offset A Vth of the threshold voltage Vth ranges from −mV to +nV, and a variation of the current can be maintained within 5%.

To sum up, the pixel compensation circuit provided by the present application can realize compensation of the threshold voltage of the driving transistor (i.e., the driving transistor T2 in the present application) by adopting a set of GOA structure and simple timing control. Thus, uniformity and accuracy of luminous brightness of the light-emitting device LED can be improved. Compared with the pixel compensation circuit in prior art, the scanning signal lines adopted by the present application are less, so that it is convenient to achieve narrow bezel of display products.

Figure 7:
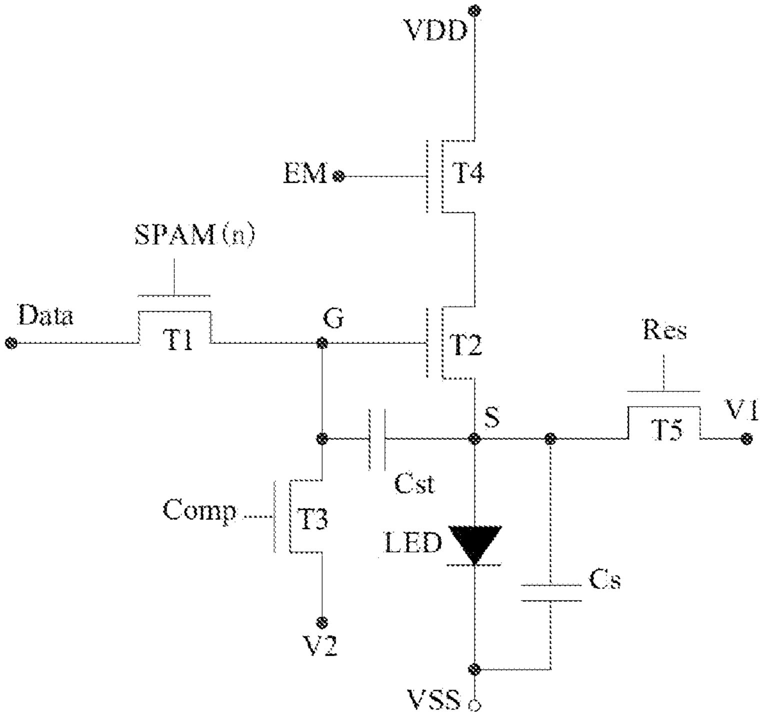
FIG. 7 is a circuit diagram of a pixel compensation circuit provided in an embodiment of the present application.

In another embodiment of the present application, a pixel compensation circuit is further provided. As shown in FIG. 7, the pixel compensation circuit provided by this embodiment is based on the pixel compensation circuit in FIG. 1, and a connection position of the first capacitor Cs is replaced into a connection position between the second node S and the negative power supply VSS. That is, in this embodiment, one terminal of the first capacitor Cs is electrically connected to the second node S, and another terminal of the first capacitor Cs is electrically connected to the power source negative electrode VSS.

In this embodiment, the pixel compensation circuit compensates the threshold voltage of the driving transistor T2 by adopting the reset stage, the detection stage, the data writing stage, and the light emitting stage as described above.

Figure 8:
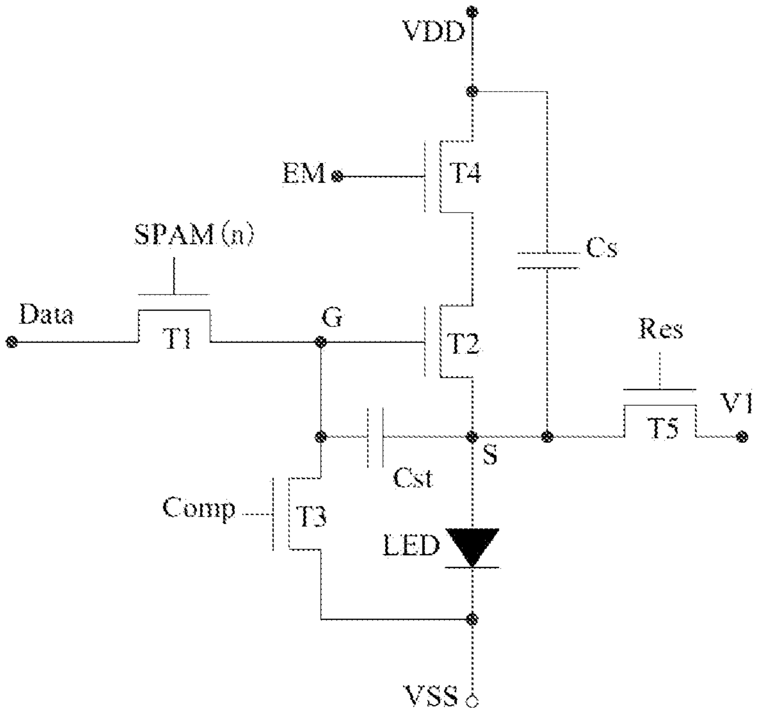
FIG. 8 is a circuit diagram of a pixel compensation circuit provided in an embodiment of the present application.

In another embodiment of the present application, a pixel compensation circuit is further provided, as shown in FIG. 8. The pixel compensation circuit provided by this embodiment is based on the pixel compensation circuit in FIG. 1, and the drain of the reset transistor T3 is electrically connected to the negative power supply VSS. that is, in this embodiment, the gate of the reset transistor T3 is electrically connected to the compensation control line Comp(n), the source of the reset transistor T3 is electrically connected to the first node G, and the drain of the reset transistor T3 is electrically connected to the negative power supply VSS. A VSS signal provided by the negative power supply VSS is used as a reset signal and a compensation stage voltage of the first node G.

In this embodiment, the pixel compensation circuit compensates the threshold voltage of the driving transistor T2 by adopting the reset stage, the detection stage, the data writing stage, and the light emitting stage as described above.

The pixel compensation circuit provided by this embodiment can reduce the number of signal lines, thereby saving layout space.

Figure 9:
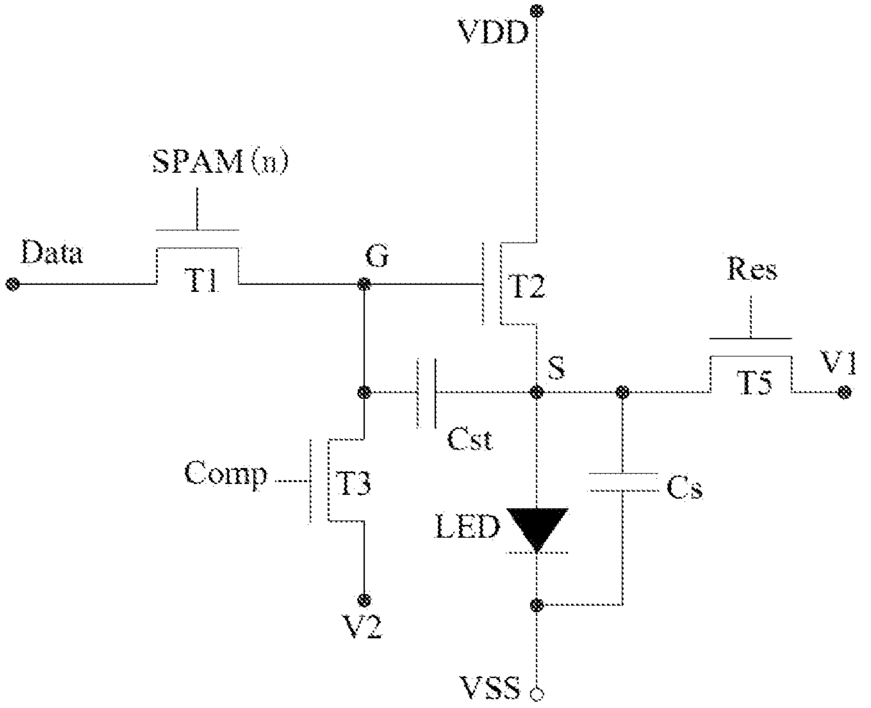
FIG. 9 is a circuit diagram of a pixel compensation circuit provided in an embodiment of the present application.

In another embodiment of the present application, a pixel compensation circuit is further provided. As shown in FIG. 9, the pixel compensation circuit provided by this embodiment is based on the pixel compensation circuit in FIG. 1, and a connection position of the first capacitor Cs is replaced into a connection position between the second node S and the negative power supply VSS. That is, in this embodiment, one terminal of the first capacitor Cs is electrically connected to the second node S, and another terminal of the first capacitor Cs is electrically connected to the negative power supply VSS.

The pixel compensation circuit provided by this embodiment also removes the first switching transistor T4 in the pixel compensation circuit shown in FIG. 1 on the basis of the pixel compensation circuit shown in FIG. 1. Specifically, the gate of the driving transistor T2 is electrically connected to the first node G. The source of the driving transistor T2 is electrically connected to the positive power supply VDD. The drain of the driving transistor T2 is electrically connected to the positive electrode of the light-emitting device LED. The positive power supply VDD is replaced by an alternating current (AC) signal.

Figure 10:
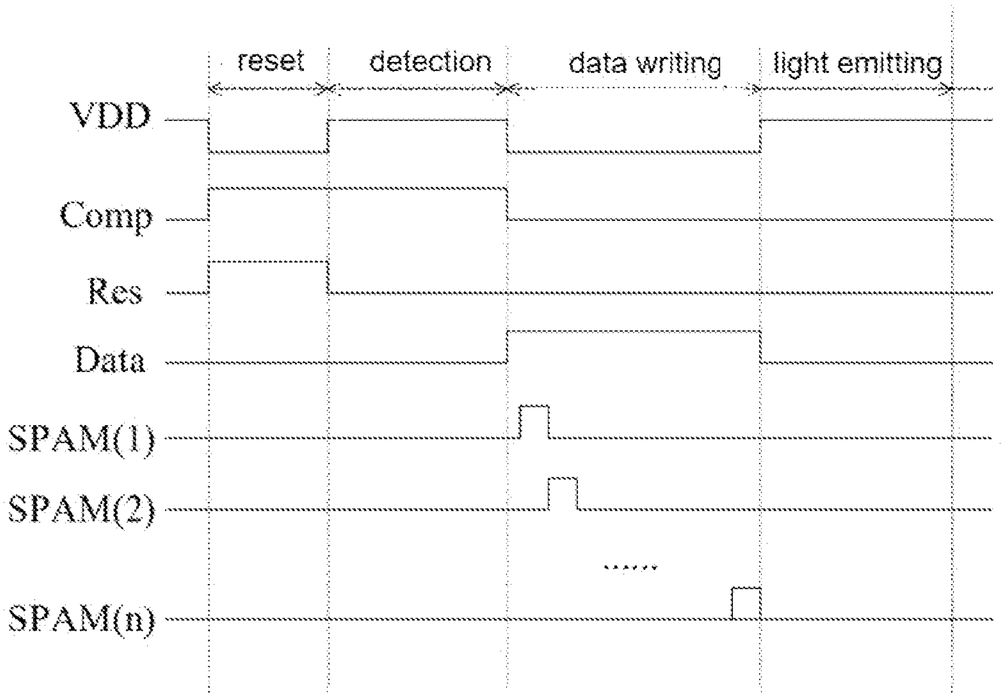
FIG. 10 is a timing diagram of a pixel compensation circuit provided in an embodiment of the present application.

In this embodiment, the pixel compensation circuit implements compensation of the threshold voltage of the driving transistor T2 by using a method of timing control as described in FIG. 10.

The pixel compensation circuit provided by the embodiment can reduce complexity of the circuit, and reduce power consumption of the display panel.

In another embodiment of the present application, the present application further provides a method for compensating pixel, as shown in FIGS. 1 and 2, the method for compensating pixel includes steps 101 to 105.

Step 101, providing the pixel compensation circuit as shown in FIG. 1.

The pixel compensation circuit includes the compensation transistor T1, the driving transistor T2, the reset transistor T3, the first switching transistor T4, the second switching transistor T5, the first capacitor Cs, the second capacitor Cst, and the light-emitting device LED.

Step 102, providing the control signal line EM and the current stage scanning signal line SPAM (n) with a low level, and providing the compensation control line Comp(n) and the reset signal line Res with a high level during a reset stage, so that the reset transistor T3 and the second switching transistor T5 are both in an on state, and the compensation transistor T1 and the first switching transistor T4 are both in an off state. A potential of the first node G is reset to a second voltage V2 provided by the second voltage terminal V2, and a potential of the second node S is reset to a first voltage V1 provided by the first voltage terminal V1.

Step 103, providing the control signal line EM and the compensation control line Comp(n) with a high level, and providing the reset signal line Res and the current stage scanning signal line SPAM (n) with a low level during a detection stage, so that the first switching transistor T4 and the reset transistor T3 are both in an on state, and the second switching transistor T5 and the compensation transistor T1 are both in an off state. The voltage of the second node S changes into a third voltage V3, and the third voltage V3=V2−Vth. V2 is the second voltage V2, and Vth is a threshold voltage of the driving transistor T2.

Step 104, providing the control signal line EM, the reset signal line Res, and the compensation control line Comp(n) with a low level, and providing current scanning signal lines SPAM(n) with a high level row by row during a data writing stage, so that the compensation transistor T1 is in an on state, and the reset transistor T3, the first switching transistor T4, and the second switching transistor T5 are all in an off state. The first node G is written into a data signal Vdata. The voltage of the second node S changes into a fourth voltage V4, the fourth voltage V4=V3+(Data−V2)*[Cst/(Cst+C1)] =V2−Vth+(Data−V2)*[Cst/(Cst+C1)]. Data is a data signal input by the data line Vdata.

Step 105, providing the control signal line EM with a high level, and providing the compensation control line Comp(n), the reset signal line Res, and the current stage scanning signal line SPAM(n) with a low level during a light emitting stage, so that the first switching transistor T4 and the driving transistor T2 are in an on state, and the reset transistor T3, the second switching transistor T5, and the compensation transistor T1 are in an off state. A source-drain voltage of the driving transistor T2 T2_Vgs=(Data−V2)*[Cst/(Cst+C1)]+Vth, and the light-emitting device LED emits light.

In another embodiment of the present application, the present application provides a display panel comprising a pixel compensation circuit as described above or employing the method of compensating pixel.

The pixel compensation circuit, the method of compensating pixel, and the display panel provided by the embodiment of the present application are described in detail above. The principle and the implementation mode of the present application are described by applying specific examples in this article. The description of the above embodiments is only used to help understand the method and core idea of the present application. Meanwhile, to those skilled in the art, according to idea of the present application, there may be changes in specific embodiments and application scope. In summary, contents of the specification should not be understood as limiting the present application.

What is claimed is:

1. A pixel compensation circuit, comprising a data writing transistor, a driving transistor, a reset transistor, a first switching transistor, a second switching transistor, a first capacitor, a second capacitor, and a light-emitting device;

wherein a gate of the data writing transistor is electrically connected to a current stage scanning signal line, a source of the data writing transistor is electrically connected to a first node, and a drain of the data writing transistor is electrically connected to a data line; the current stage scanning signal line is configured to provide a scanning signal, and the data line is configured to provide a data signal;

wherein a gate of the driving transistor is electrically connected to the first node, a source of the driving transistor is electrically connected to a drain of the first switching transistor, a drain of the driving transistor is electrically connected to a positive electrode of the light-emitting device, and a negative electrode of the light-emitting device is electrically connected to a negative power supply;

wherein the reset transistor is configured to reset a potential of the first node to be a second voltage provided by the second voltage terminal during a reset stage; wherein a gate of the reset transistor is electrically connected to a compensation control line, a source of the reset transistor is electrically connected to the first node, and a drain of the reset transistor is electrically connected to the second voltage terminal;

wherein a gate of the first switching transistor is electrically connected to a control signal line, a source of the first switching transistor is electrically connected to a positive power supply, and a drain of the first switching transistor is electrically connected to the source of the driving transistor;

wherein a gate of the second switching transistor is electrically connected to a reset signal line, a source of the second switching transistor is electrically connected to a first voltage terminal, a drain of the second switching transistor is electrically connected to a connection point between the drain of the driving transistor and the positive electrode of the light-emitting device, a second node is formed at the connection point;

wherein one terminal of the first capacitor is electrically connected to the positive power supply, and another terminal of the first capacitor is electrically connected to the second node; and wherein one terminal of the second capacitor is electrically connected to the first node, and another terminal of the second capacitor is electrically connected to the second node.

2. The pixel compensation circuit according to claim 1, wherein the pixel compensation circuit operates sequentially with an operation period comprising the reset stage, a detection stage, a data writing stage, and a light emitting stage; and wherein the reset transistor is further configured to be in an on state to transmit the second voltage to the first node during the detection stage.

3. The pixel compensation circuit according to claim 1, wherein during the reset stage, both the control signal line and the current stage scanning signal line are provided with a low level, and both the compensation control line and the reset signal line are provided with a high level.

4. The pixel compensation circuit according to claim 1, wherein during the reset stage, both the reset transistor and the second switching transistor are in an on state, and both the data writing transistor and the first switching transistor are in an off state.

5. The pixel compensation circuit according to claim 1, wherein during a detection stage, both the control signal line and the compensation control line are provided with a high level, and both the reset signal line and the current stage scanning signal line are provided with a low level.

6. The pixel compensation circuit according to claim 1, wherein during the detection stage, the first switching transistor and the reset transistor are both in an on state, and the second switching transistor and the data writing transistor are both in an off state.

7. The pixel compensation circuit according to claim 1, wherein during a data writing stage, the control signal line, the reset signal line, and the compensation control line are provided with a low level, and current stage scanning signal lines are provided with a high level row by row.

8. The pixel compensation circuit according to claim 1, wherein during a data writing stage, the data writing transistor is in an on state, and the reset transistor, the first switching transistor, and the second switching transistor are in an off state.

9. The pixel compensation circuit according to claim 1, wherein during a light emitting stage, the control signal line is provided with a high level, and the compensation control line, the reset signal line, and the current stage scanning signal line are provided with a low level.

10. The pixel compensation circuit according to claim 1, wherein during the light emitting stage, the first switching transistor is in an on state, and the reset transistor, the second switching transistor, and the data writing transistor are all in an off state.

11. A driving method of a pixel compensation circuit, the pixel compensation circuit comprising:

data writing transistor, a driving transistor, a reset transistor, a first switching transistor, a second switching transistor, a first capacitor, a second capacitor, and a light-emitting device;

wherein a gate of the data writing transistor is electrically connected to a current stage scanning signal line, a source of the data writing transistor is electrically connected to a first node, and a drain of the data writing transistor is electrically connected to a data line;

wherein a gate of the driving transistor is electrically connected to the first node, a source of the driving transistor is electrically connected to a drain of the first switching transistor, and a drain of the driving transistor is electrically connected to a positive electrode of the light-emitting device; and a negative electrode of the light-emitting device is electrically connected to a negative power supply;

wherein a gate of the reset transistor is electrically connected to a compensation control line, a source of the reset transistor is electrically connected to the first node, and a drain of the reset transistor is electrically connected to a second voltage terminal;

wherein a gate of the first switching transistor is electrically connected to a control signal line, a source of the first switching transistor is electrically connected to a positive power supply, and a drain of the first switching transistor is electrically connected to the source of the driving transistor; wherein a gate of the second switching transistor is electrically connected to a reset signal line, a source of the second switching transistor is electrically connected to a first voltage terminal, and a drain of the second switching transistor is electrically connected to a connection point between the drain of the driving transistor and the positive electrode of the light-emitting device; and a second node is formed at the connection point;

wherein a terminal of the first capacitor is electrically connected to the positive power supply, and another terminal of the first capacitor is electrically connected to the second node; wherein a terminal of the second capacitor is electrically connected to the first node, and another terminal of the second capacitor is electrically connected to the second node;

the driving method comprising:

providing the control signal line and the current stage scanning signal line with a low level, and providing the compensation control line and the reset signal line with a high level during a reset stage, so that the reset transistor and the second switching transistor are both in an on state, and the data writing transistor and the first switching transistor are both in an off state; wherein a potential of the first node is reset to a second voltage provided by the second voltage terminal, and a potential of the second node is reset to a first voltage provided by the first voltage terminal.

12. The driving method of pixel compensation circuit according to claim 11, further comprising:

providing the control signal line and the compensation control line with a high level, and providing the reset signal line and the current stage scanning signal line with a low level during a detection stage, so that the first switching transistor and the reset transistor are both in an on state, and the second switching transistor and the data writing transistor are both in an off state; wherein the voltage of the second node changes into a third voltage V3, the third voltage V3=V2−Vth, V2 is the second voltage V2, and Vth is a threshold voltage of the driving transistor.

13. The driving method of pixel compensation circuit according to claim 11, further comprising:

providing the control signal line, the reset signal line, and the compensation control line with a low level, and providing current stage scanning signal lines with a high level row by row during a data writing stage, so that the data writing transistor is in an on state, and the reset transistor, the first switching transistor, and the second switching transistor are all in an off state; wherein the first node is written into a data signal, a voltage of the second node changes into a fourth voltage V4, the fourth voltage V4=V3+(Data−V2)*[Cst/(Cst+C1)]=V2−Vth+(Data−V2)*[Cst/(Cst+C1)], Data is a data signal input from a data line Vdata.

14. The driving method of pixel compensation circuit according to claim 11, further comprising:

providing the control signal line with a high level, and providing the compensation control line, the reset signal line, and the current stage scanning signal line with a low level during a light emitting stage, so that the first switching transistor and the driving transistor are in an on state, and the reset transistor, the second switching transistor, and the data writing transistor are in an off state; wherein a source-drain voltage of the driving transistor T2_Vgs=(Data−V2)*[Cst/(Cst+C1)]+Vth, and the light-emitting device emits light.

15. A display panel, comprising a pixel compensation circuit, the pixel compensation circuit comprising a data writing transistor, a driving transistor, a reset transistor, a first switching transistor, a second switching transistor, a first capacitor, a second capacitor, and a light-emitting device;

wherein a gate of the data writing transistor is electrically connected to a current stage scanning signal line, a source of the data writing transistor is electrically connected to a first node, and a drain of the data writing transistor is electrically connected to a data line; the current stage scanning signal line is configured to provide a scanning signal, and the data line is configured to provide a data signal;

wherein a gate of the driving transistor is electrically connected to the first node, a source of the driving transistor is electrically connected to a drain of the first switching transistor, a drain of the driving transistor is electrically connected to a positive electrode of the light-emitting device, and a negative electrode of the light-emitting device is electrically connected to a negative power supply;

wherein the reset transistor is configured to reset a potential of the first node to be a second voltage provided by the second voltage terminal during a reset stage; wherein a gate of the reset transistor is electrically connected to a compensation control line, a source of the reset transistor is electrically connected to the first node, and a drain of the reset transistor is electrically connected to a second voltage terminal;

wherein a gate of the first switching transistor is electrically connected to a control signal line, a source of the first switching transistor is electrically connected to a positive power supply, and a drain of the first switching transistor is electrically connected to the source of the driving transistor;

wherein a gate of the second switching transistor is electrically connected to a reset signal line, a source of the second switching transistor is electrically connected to a first voltage terminal, and a drain of the second switching transistor is electrically connected to a connection point between the drain of the driving transistor and the positive electrode of the light-emitting device; and a second node is formed at the connection point;

wherein a terminal of the first capacitor is electrically connected to the positive power supply, and another terminal of the first capacitor is electrically connected to the second node; and wherein a terminal of the second capacitor is electrically connected to the first node, and another terminal of the second capacitor is electrically connected to the second node.

* * * * *